3,845,110
PROCESS FOR THE RECOVERY OF N-ACYL-D-
METHIONINE AND N-ACYL-L-METHIONINE
Rudolf Fahnenstich, Strotzbach, and Joachim Heese, Grossauheim, Germany, assignors to Deutsche Gold- und Silber-Scheideanstalt vormals Roessler, Frankfurt am Main, Germany
No Drawing. Filed Apr. 11, 1972, Ser. No. 243,067
Claims priority, application Germany, May 27, 1971,
P 21 26 383.2
Int. Cl. C07c 101/02
U.S. Cl. 260—501.12                5 Claims

ABSTRACT OF THE DISCLOSURE

N-acyl-D-methionine and N acyl-L-methionine are recovered from mixtures thereof by fractional crystallization of their diastereomer salts with D-lysine or L-lysine.

The present invention is directed to a process for the recovery of N-acyl-D-methionine and N-acyl-L-methionine from mixtures of these materials by fractional crystallization of their diastereomer salts with optically active bases.

The methionine occurring in nature, which for example is an important additive for foods, is L-methionine. Since in the chemical synthesis of methionine the racemate D,L-methionine is formed exclusively, in order to recover L-methionine by way of chemical synthesis it is always necessary to split the racemate.

It is known that L-methionine can be recovered by action of enzymes on the N-acyl derivatives of D,L-methionine. There results a mixture of L-methionine and N-acyl-D-methionine from which the L-methionine can be relatively easily separated. However, this process has the disadvantage that the recovery of the enzyme is expensive and the enzymes besides are only stable for a short time.

It is also known in order to separate N-acyl-D,L-methionine into its optical antipodes to react it with certain optically active bases, namely treo-2-amino-(p-methylsulfonylphenyl)-1,3 - propanediol, brucine or fenchylamine, and to separate diastereomer salts from each other on the basis of their different physical properties, especially their different solubilities. (J. P. Greenstein, M. Winitz, Chemistry of Amino Acids, vol. 1, John Wiley & Sons, Inc. New York-London 1961). These previously used optically active bases are difficultly accessible; their use is therefore expensive.

There has now been discovered a process for the separation of N-acyl-D-methionine or N-acyl-L-methionin from mixtures of these two materials by fractional crystallization of their diastereomer salts with the optically active bases D-lysine or L-lysine.

D-lysine and L-lysine are optically active bases which are easily available. Surprisingly they form with N-acyl-D-methionine and N-acyl-L-methionine diastereomer salts which have such strongly different physical properties that there can be obtained a high degree of separation. By a single fractional crystallization from a mixture containing equal amounts of N-acyl-D-methionine and N-acyl-L-methionine there can be obtained an about 50% yield of one of these two materials in an optical purity of 90 to 95%.

From the same solution there can be selectively separated one component by crystallization at higher temperature and the other by crystallization at lower temperature.

Thus using D-lysine at higher temperatures there preferentially crystallizes D-lysine-N-acyl-D-methionine and at lower temperatures there preferentially crystallizes D-lysine-N-acyl-L-methionine. Conversely using L-lysine at higher temperature there is preferentially separated L-lysine-N-acyl-L-methionine and at lower temperatures there is preferentially separated L-lysine-N-acyl-D-methionine.

As starting materials for the recovery of N-acyl-D-methionine or N-acyl-L-methionine by the process of the invention there are used in general isomeric mixtures which contain the optically active components in equal amounts. Especially there is used the racemate N-acyl-D,L-methionine which has been produced by the acylation of D,L-methionine synthesized chemically. However, there can also be used isomeric mixtures in which the components are present in different amounts. In the case where it is desired to recover from such a mixture the component present in smaller amount, it is recommended that the mixture first be racemized. This can be accomplished in known manner by heating an aqueous solution under pressure, in a given case in the presence of acids or bases.

The acyl derivatives of D- or L-methionine which can be recovered by the process are chiefly derivatives of aliphatic carboxylic acids, especially containing up to 4 carbon atoms or the derivatives of aromatic carboxylic acids, especially benzoic acid, p-nitrobenzoic acid, benzene sulfonic acid and p-toluene sulfonic acid. Preferably the process is used for the recovery of N-formyl or N-acetyl derivatives of D-methionine or L-methionine. Correspondingly preferably the starting mixture contains N-formyl-D-methionine and N-formyl-L-methionine or is a mixture of N-acetyl-D-methionine and N-acetyl-L-methionine. Other suitable starting mixtures include mixtures of the D and L forms of N-propionyl methionine, N-butyryl methionine, N-isobutyryl methionine, N-valeroyl-methionine, N-benzoyl methionine, N - p - methylbenzoyl methionine, N-naphthoxyl methionine, N-p-toluene sulfonyl methionine, N-o-toluene sulfonyl methionine, N-p-nitrobenzoyl methionine, N-m-nitrobenzoyl methionine.

The fractional crystallization of the diastereomeric salts is advantageously carried out in alcoholic solutions. As alcohols there are mainly used lower alkanols such as methanol, ethanol, isopropanol, propanol, butanol, sec. butanol. Mixtures of alcohols can also be employed. In many cases it is suitable to add alcohols in admixture with water. The amount of water, however, generally does not exceed 20%. An example of a suitable alcohol-water mixture is 95% isopropyl alcohol.

For each mole of the methionine isomeric mixture there is suitably added about 0.5 to about 1.5 moles, preferably about 1.0 mole of the D-lysine or L-lysine.

There are several possible ways for preparing the solutions for fractional crystallization. Generally the mixture of the acyl derivatives of D-methionine and L-methionine together with lysine isomer involved are dissolved in the smallest possible amount of alcohol at elevated temperature, primarily at temperatures between 40 and 60° C. However, there can also be used mixtures of the acyl derivatives of D-methionine and L-methionine and the lysine isomer first dissolved separately in corresponding amounts of alcohol, generally at temperatures between 0 and 60° C., followed by combining the separate solutions. Instead of an alcohol there can be used, to form the solution, water or a mixture of alcohol and water; in a given case alcohol is subsequently added.

In order to carry out the fractional crystallization it is provided in a suitable manner that the solution is adjusted to the desired crystallization temperature and then is inoculated. For inoculation there is added the purest possible fraction of the substance to be crystallized out, primarily in an amount of 0.1 to 3.0%.

As crystallization tempertatures there are employed primarily temperatures between about −15° C. and +80° C., especially in the range of (a) between about +40 and about +70° C. and (b) between about −5 and about +30° C. In the higher range (a) there is preferentially recovered L-lysine-N-acyl-L-methionine when employing L-lysine and D-lysine -N-acyl-D-methionine when using D-lysine, while in the lower range (b) there is preferentially recovered L-lysine-N-acyl-D-methionine when using L-lysine and D-lysine-N-acyl-L-methionine when using D-lysine. Which crystallization temperature is best suited is dependent upon the type of alcohol, the amount of water, the concentration of the substance in solution and the type of acyl derivative. The stated temperature ranges are especially valid in the crystallization of the formyl or acetyl derivatives of methionine.

For crystallization the solution is held for some time after the inoculation at the specified temperature. The crystallization generally requires at least 0.25 hour, usually 1 to 4 hours, sometimes up to 24 hours but seldom over 24 hours. The crystallization time can be shortened by stirring. Also it is dependent to a certain extent upon the remaining process conditions, especially the type of alcohol. For example longer times are required using aqueous or anhydrous methanol than with aqueous isopropanol.

If necessary to increase the optical purity the crystallizate is repeatedly fractionally crystallized in the same manner.

In order to split off the D-lysine or L-lysine from the substance obtained by fractional crystallization the D-lysine-N-acyl or L-lysine-N-acyl derivative of D-methionine or L-methionine is treated with acid. Preferably either the aqueous solution of the substance is brought in contact with an acid ion exchanger (e.g., sulfonated styrene-divinyl benzene copolymer such as Dowex–50) which binds the D-lysine or L-lysine, or a paste or solution of the substance in an alcohol, especially in methanol, is mixed with a solution of hydrogen chloride in an alcohol, especially in methanol and thereby the D-lysine or L-lysine precipitated as the hydrochloride. Other acids can be used, e.g. hydrobromic acid or sulfuric acid, and other alcohols, e.g. ethyl alcohol and isopropyl alcohol. The N-acyl derivative of D-methionine or L-methionine is separated from the remaining solution by evaporation of the solution.

Both with ion exchange bound and hydrochloride precipitated D-lysine or L-lysine, the bases can be recovered without almost any loss by the use of alkali, suitably by use of dilute aqueous ammonia or alcoholic alkali hydroxide solution, e.g. sodium hydroxide or potassium hydroxide in ethyl alcohol. It is then available to be employed again for the formation of diastereomers with the methionine. In a corresponding manner the D-lysine or L-lysine can be recovered from the mother liquor resulting from the fractional crystallization.

In the case where only one of the two optically active isomers of the N-acyl-methionine is to be recovered, only this is separated by the fractional crystallization. The isomeric mixture of N-acyl-methionines remaining in the mother liquor is racemized after splitting off the lysine. By repeating the crystallization and racemization gradually the entire N-acyl-methionine can be recovered in the form of the desired isomer.

The N-acyl derivative of D-methionine or L-methionine resulting from the fractional crystallization according to the process of the invention can be converted to D-methionine or L-methionine in a simple manner. For this purpose it is treated at elevated temperature with dilute acid, for example it can be dissolved in 2 normal hydrochloric acid and this solution then warmed for some time to about 100° C.

In the following examples the rotational power of the substance is always stated as specific rotation $[\alpha]_D^{25}$ in degrees × cm.$^3$/decimeters × grams.

Unless otherwise indicated all parts and percentages are by weight.

EXAMPLE 1

There were mixed 14.6 grams of L-lysine which had a specific rotation of +22.9 and consequently had an optical purity of 86% (concentration of the measuring solution 1.6 grams/100 ml., solvent 6 normal aqueous hydrochloric acid) and 19.1 grams of the N-acetyl-D,L-methionine racemate. The mixture was dissolved in 150 ml. of methanol at 50° C. The solution was cooled to 20° C., inoculated with 0.1 grams of L-lysine-N-acetyl-D-methionine and held for 15 hours at 4° C. The crystals which separated and consisted essentially of L-lysine-N-acetyl-D-methionine were filtered off with suction, washed with 40 ml. of cold methanol and dried at 20 torr and 40° C. The amount of dry material was 16.5 grams corresponding to a yield of 95% based on the N-acetyl-D-methionine employed. The product had a specific rotation of +16.5 (concentration of the measuring solution 4.0 grams/100 ml., solvent 5 normal aqueous hydrochloric acid). The specific rotation of a salt formed from optically pure L-lysine and N-acetyl-D-methionine in comparison was +21.3. Consequently the L-lysine-N-acetyl-D-methionine recovered had an optical purity of 78%.

EXAMPLE 2

A mixture of 14.6 grams of L-lysine that had a specific rotation of +25.0 (concentration of the measuring solution 1.6 grams/100 ml., solvent 5 normal hydrochloric acid) and 19.1 grams of the racemate N-acetyl-D,L-methionine were treated in the same manner as in example 1. There were recovered 9.5 grams of L-lysine-N-acetyl-D-methionine corresponding to a yield of 56% based on the N-acetyl-D-methionine used. The specific rotation was +20.1, corresponding to an optical purity of 94%.

EXAMPLE 3

A mixture of 14.6 grams of L-lysine which had a specific rotation of +22.9 (concentration of the measuring solution 1.6 grams/100 ml., solvent 6 normal hydrochloric acid) and 19.1 grams of the racemate N-acetyl-D,L-methionine were dissolved in 200 ml. of methanol at 40° C. The solution was cooled to 2° C. and after the addition of 0.05 grams of L-lysine-N-acetyl-D-methionine held at 2° C. for 4 hours with stirring. The separated crystals which consisted essentially of L-lysine-N-acetyl-D-methionine were filtered off with suction, washed with 40 ml. of cold methanol and dried under reduced pressure at 40° C. The yield was 13.3 grams, corresponding to 79°, based on the N-acetyl-D-methionine added. The product had a specific rotation of +16.0, corresponding to an optical purity of 76%.

EXAMPLE 4

A mixture of 14.6 grams of L-lysine which had a specific rotation of +22.9 (concentration of the measuring solution 1.6 gr./100 ml., solvent 6 normal hydrochloric acid), and 19.1 grams of N-acetyl D-methionine, which had a specific rotation of +9.6 (concentration of the measuring solution 2.0 grams/100 ml., solvent water) and consequently had an optical purity of 48%, were dissolved in 150 ml. of methanol at 60° C. The solution was cooled to 2° C., inoculated with 0.05 gram of L-lysine-N-acetyl-D-methionine and then held for an hour at 2° C. The crystals, which separated, consisted essentially of L-lysine-N-acetyl-D-methionine and were removed by suction filtration, washed with methanol and dried under reduced pressure. The yield was 255. grams, corresponding to 88% based on the N-acetyl-D-methionine added. The product had a specific rotation of +18.8%, corresponding to an optical purity of 84%.

12.2 grams of the substance recovered were dissolved in 50 ml. of water and passed over 100 grams of an acid ion exchange resin (H+ form of Dowex–50). The eluate was concentrated by evaporation. There were recovered 6.6 grams of N-acyl-D-methionine. The product had a specific rotation of +16.0 (concentration of the measuring solution 2 grams/100 ml., solvent water), corresponding to an optical purity of 80%.

The ion exchange resin was eluated with 5% aqueous ammonia. By concentration of the eluate by evaporation there precipitated 6.9 grams of L-lysine, corresponding to a yield of 100%, based on the L-lysine added. The product had a specific rotation of +21.3, corresponding on an optical purity of 83%.

EXAMPLE 5

A suspension of 20.0 grams of L-lysine mono hydrochloride in 100 ml. of methanol was mixed with 100 ml. of a 1 normal potassium hydroxide solution in methanol. The mixture was stirred for 15 minutes at room temperature. The precipitated potassium chloride was removed with suction. There were dissolved with heating 19.1 grams of the racemate N-acetyl-D,L-methionine in the residual methanol solution. The solution was then cooled to 0° C., inoculated with 0.1 grams of L-lysine-N-acetyl-D-methionine and held for 2 hours at 0° C. with stirring. The crystals formed, which consisted essentially of L-lysine-N-acetyl-D-methionine, were filtered off, washed with 40 ml. of cold methanol and dried. The yield was 12.3 grams corresponding to 73% based on the N-acetyl-D-methionine added. The product had a specific rotation of +17.0, corresponding to an optical purity of 76%.

10 grams of this product were suspended in 50 ml. of methanol. There were added 8 ml. of a 3.7 normal hydrogen chloride solution in methanol. This mixture was stirred for 15 minutes. The L-lysine monohydrochloride precipitated was filtered off. The yield was 5.2 grams, corresponding to 96%. The L-lysine had a specific rotation of +23.0, corresponding to an optical purity of 87%. The solution remaining after filtering off the L-lysine mono hydrochloride was concentrated by evaporation. There resulted 5.5 grams of N-acetyl-D-methionine, corresponding to a yield of 98%. The product had a specific rotation of +16.8%, corresponding to an optical purity of 83%.

The mother liquor remaining after the fractional crystallization and filtering off of the L-lysine-N-acetyl-D-methionine was treated with 23.6 ml. of a 3.7 normal hydrogen chloride solution in methanol. The mixture was stirred for 15 minutes. The L-lysine mono hydrochloride which separated was filtered off. There were recovered 11.5 grams of this material, corresponding to a yield of 9%. The material had a specific rotation of +23.0, corresponding to an optical purity of 87%. There were recovered 12.1 grams of N-acetyl-L-methionine by concentration by evaporation of the solution remaining after the filtration of the L-lysine monohydrochloride, corresponding to a yield of 99%. This product had a specific rotation of −10.8, corresponding to an optical purity of 46%.

EXAMPLE 6

A mixture of 1.46 grams of optically pure L-lysine and 1.77 grams of the racemate N-formyl-D,L-methionine were dissolved in 15 ml. of methanol at 60° C. The solution was cooled to 4° C., inoculated with L-lysine-N-formyl-D-methionine and then held for 4.5 hours at 4° C. The yield of L-lysine-N-formyl-D-methionine was 1.45 grams, corresponding to 90%, based on the N-formyl-D-methionine added. The product had a specific rotation of +10.0 (concentration of the measuring solution 4.0 grams/100 ml., solvent 5 normal hydrochloric acid), corresponding to an optical purity of 89%.

EXAMPLE 7

A mixture of 5.85 grams of optically pure L-lysine and 7.64 grams of the racemate N-acetyl-D,L-methionine were dissolved in a mixture of 8 grams of water and 132 grams of isopropanol at 60° C. The solution was inoculated with 0.1 gram of L-lysine-N-acetyl-L-methionine and then held for 2 hours at 45° C. The crystallized product consisting essentially of L-lysine-N-acetyl-L-methionine, was filtered off, washed with 17 ml. of isopropanol and dried. The yield was 5.9 grams, corresponding to 88% based on the N-acetyl-L-methionine added. The product had a specific rotation of +4.6 (concentration of the measuring solution 4.0 grams/100 ml., solvent 5 normal hydrochloric acid), corresponding to an optical purity of 60%.

The mother liquor was cooled to 4° C., inoculated with 0.1 gram of L-lysine-N-acetyl-D-methionine and held for 2 hours at that temperature. The product which crystallized out consisting essentially of L-lysine-N-acetyl-D-methionine was filtered off, washed with 17 ml. of isopropanol and dried. The yield was 5.8 grams, corresponding to 85% based on the N-acetyl-D-methionine added. The product had a specific rotation of +18.7 (concentration of the measuring solution 4.0 grams/100 ml., solvent 5 normal hydrochloric acid), corresponding to an optical purity of 67%.

EXAMPLE 8

4.9 grams of the L-lysine-N-acetyl-L-methionine recovered in Example 7 were dissolved in 6.6 ml. of water. The solution was mixed with 108 ml. of isopropanol. The mixture was heated to 45° C., treated with 0.1 gram of L-lysine-N-acetyl-L-methionine and held for one hour at 45° C. The product which separated consisting essentially of L-lysine-N-acetyl-L-methionine was washed with 15 ml. of isopropanol and dried. There were recovered 3.9 grams, corresponding to a yield of 79%. The product had a specific rotation of +1.2, corresponding to an optical purity of 89%.

EXAMPLE 9

A mixture of 1.46 grams of optically pure D-lysine and 1.96 grams of the racemate N-acetyl-D,L-methionine was dissolved in 3.7 ml. of water at 50° C. The solution was added to 66 ml. of isopropanol and 0.1 gram of D-lysine-N-acetyl-D-methionine heated to 50° C. The mixture was held a half hour at 50° C. The crystallizate was filtered off and washed with 50 ml. of isopropanol. The yield of D-lysine-N-acetyl-D-methionine was 2.1 grams, corresponding to a yield of 124% based on the N-acetyl-D-methionine added. The product had a specific rotation of -5,3, corresponding to an optical purity of 53%.

What is claimed is:

1. A process for preparing a salt of N - formyl - D - methionine, N-acetyl - D - methionine, N-formyl-L-methionine or N-acetyl-L-methionine with D-lysine or L-lysine of improved purity from mixtures of either N-formyl-D-methionine and N-formyl-L-methionine or N-acetyl-D-methionine and N-acetyl-L-methionine comprising forming a mixture of either N-formyl-D-methionine and N-formyl-L-methionine or N-acetyl-D-methionine and N-acetyl-L-methionine with either D-lysine or L-lysine in a solvent which is a lower alkanol containing 0 to 20% by weight of water and fractionally crystallizing from said solvent the D-lysine or L-lysine salt of one of said N-formyl-D-methionine, N-acetyl-D-methionine, N-formyl-L-methionine or N-acetyl-L-methionine by adjustng the temperature of the solution to preferentially precipitate one of said salts and recovering said precipitated salt.

2. A process according to claim 1 wherein there is recovered the L-lysine salt of N-formyl-L-methionine or N-acetyl-L-methionine employing L-lysine and crystallizing at a temperature between +40 and +70° C.

3. A process according to claim 1 wherein there is recovered the D-lysine salt of N-formyl-L-methionine or N-acetyl-L-methionine employing D-lysine and crystallizing at a temperature between −5 and +30° C.

4. A process according to claim 1 wherein there is recovered the D-lysine salt of N-formyl-L-methionine or N-acetyl-L-methionine employing D-lysine and crystallizing at a temperature between +40° and +70° C.

5. A process according to claim 1 wherein there is recovered the L-lysine salt of N-formyl-D-methionine or N-acetyl-D-methionine employing L-lysine and crystallizing at a temperature between −5 and +30° C.

References Cited

FOREIGN PATENTS 92M 1/1961 France.

OTHER REFERENCES

Eliel, Stereochemistry of Carbon Compounds, McGraw-Hill Book Co., New York, pp. 49–50 (1962).

LEON ZITVER, Primary Examiner

M. W. GLYNN, Assistant Examiner

U.S. Cl. X.R.

260—534 S